US010897527B2

(12) United States Patent
Ahmed

(10) Patent No.: US 10,897,527 B2
(45) Date of Patent: Jan. 19, 2021

(54) PERSONAL DEVICE DOCKING STATION FOR VIDEO CALLS

(71) Applicant: Saieed Ahmed, Aurora, IL (US)

(72) Inventor: Saieed Ahmed, Aurora, IL (US)

(73) Assignee: Saieed Ahmed, Aurora, IL (US)

( * ) Notice: Subject to any disclaimer, the term of this patent is extended or adjusted under 35 U.S.C. 154(b) by 0 days.

(21) Appl. No.: 16/591,795

(22) Filed: Oct. 3, 2019

(65) Prior Publication Data

US 2020/0120194 A1 Apr. 16, 2020

Related U.S. Application Data

(60) Provisional application No. 62/743,607, filed on Oct. 10, 2018.

(51) Int. Cl.
*H04M 1/00* (2006.01)
*H04M 1/04* (2006.01)
*F16M 11/12* (2006.01)
*H04R 1/02* (2006.01)
*F16M 11/20* (2006.01)
*G05D 3/10* (2006.01)
*H04N 7/14* (2006.01)

(52) U.S. Cl.
CPC ............ *H04M 1/04* (2013.01); *F16M 11/121* (2013.01); *F16M 11/2014* (2013.01); *G05D 3/10* (2013.01); *H04N 7/142* (2013.01); *H04R 1/028* (2013.01); *H04N 2007/145* (2013.01); *H04R 2420/07* (2013.01)

(58) Field of Classification Search
CPC . H04M 1/04; H04M 1/06; H04M 1/12; H04R 1/028; F16M 11/121
See application file for complete search history.

(56) References Cited

U.S. PATENT DOCUMENTS

| | | | | |
|---|---|---|---|---|
| 6,062,518 A | * | 5/2000 | Etue | B60R 11/0241 224/542 |
| 9,258,523 B2 | * | 2/2016 | Sobti | H04N 7/15 |
| 10,356,290 B2 | | 7/2019 | Zhu et al. | |
| 2005/0037709 A1 | * | 2/2005 | Hwang | H04N 1/00127 455/66.1 |
| 2009/0122482 A1 | * | 5/2009 | Solomon | G06F 1/1632 361/679.55 |
| 2016/0254837 A1 | * | 9/2016 | Rayner | H05K 5/061 455/575.8 |

* cited by examiner

*Primary Examiner* — Tuan Pham
(74) *Attorney, Agent, or Firm* — Cook Alex Ltd.; Ryan M. Truesdale

(57) ABSTRACT

A personal device docking station can include a base, a neck with a stationary and non-stationary portion and a rest pad that can hold a personal device such as a smartphone or tablet. When a personal device is docked in the docking station, bidirectional audio feed is established between the personal device and the docking station. A user can receive audio feed from the docking station's speakers and transmit audio feed via a plurality of microphones. The rest pad of the docking station can have a window or cutout that aligns with the camera of the docked personal device. The non-stationary portion of the neck can include multiple motorized rotation heads that allow for horizontal and vertical rotation of the rest pad and docked device.

19 Claims, 13 Drawing Sheets

PERSONAL DEVICE DOCKING STATION FOR VIDEO CALLS

CROSS-REFERENCE TO RELATED APPLICATIONS

This application is related to and claims priority from U.S. Application No. 62/743,607 having a filing date of Oct. 10, 2018, entitled "Personal Device Docking Station for Video Calls". The '607 application is hereby incorporated by reference herein in its entirety.

FIELD OF THE INVENTION

The present invention relates to a docking station for personal devices that can be used to enhance the audio and video capabilities of a smartphone or tablet during a video call or phone call.

Millions of people use the video call feature of a tablet or smartphone to connect with others both personally and professionally every single day. Video calls allow for a more intimate form of real-time communication compared to phone calls as at least one user can see the face of the person with whom he or she is speaking.

Video calls can be used to connect with friends and family that may be living great distances from one another, or in professional settings to conduct a variety of internal or client-related business tasks.

However, video calls conducted on a smartphone or tablet have a number of logistical and ergonomic drawbacks. First, the range of audio feed is limited to that of the personal device being used. Second, when multiple people are participating at one end of a video call, the personal device must be passed from user to user since it is challenging to fit multiple people into the viewing lens of a camera when the device is being held. Third, video calls can be uncomfortable as a user must hold his or her personal device for an extended period of time.

A personal device docking station for video calls that enhances the video calling/conferencing capabilities of a connected smartphone or tablet could overcome these drawbacks. Such a device could transmit the audio feed from the docked device to the speakers of the docking station, eliminating the need for users to hold their smartphone and/or tablet. This would allow a user or group of users to better participate in a video call while being situated at a distance from the docked device.

SUMMARY OF THE INVENTION

Shortcomings of existing video call stations are overcome by a personal device docking station that establishes bidirectional audio feed with a docked personal device. In some embodiments, the personal device docking station includes, a base; a neck situated substantially perpendicular to the base with a stationary portion and a non-stationary portion; a rest pad connected to the non-stationary portion of the neck, wherein the rest pad holds a docked personal device; a port for connecting the personal device to the docking station, wherein the port is located on the ledge of the rest pad; a first speaker; a control panel; and/or a plurality of microphones that allow for audio input into the docking station.

In some embodiments, the rest pad includes: a back; a ledge; a first side; and/or a second side.

In some embodiments, the rest pad can include a window that aligns with the camera of a docked smartphone or tablet such that the rear-facing and front-facing capability of the camera can be used during a video call.

In some embodiments, the rest pad can include adjustable arms that extend from the sides of the rest pad and can be positioned to accommodate various personal device sizes.

In some embodiments, the docking station can include a speaker built into the non-stationary portion of the neck.

In some embodiments, the non-stationary portion of the neck can include a first motorized rotation head that can rotate clockwise and/or counterclockwise to provide 360 degrees of horizontal rotation to the rest pad and docked device, a second motorized rotation head that can tilt the rest pad upward or downward, and/or a third motorized rotation head that can rotate the rest pad clockwise or counterclockwise from the vertical axis of the docking station. In some embodiments, a single motor can handle the three rotations listed above. In some embodiments, three motors are used to conduct each rotation separately. In at least some embodiments, the motors are built into the tower of the base.

In some embodiments, operation of the third motorized rotation head switches the camera orientation of a docked personal device between portrait and landscape settings.

In some embodiments, the docking station includes a control panel that controls the movement of each rotation head and/or the volume of audio output from the speaker(s). In at least some embodiments, the control panel includes lights that indicate when a rotational limit of the motorized rotation heads has been reached.

In some embodiments, the docking station can include a remote control configured for bidirectional communication with the docking station. In some embodiments, the remote control can include a power button, a speaker, a microphone, buttons to control the first motorized rotation head, buttons to control the second motorized rotation head, a portrait/landscape selection button, volume buttons, a home button, and/or a headphone port.

In some embodiments, the docking station can include a stationary pair of speakers, at least one USB port and/or at least one HDMI port. In some embodiments, the HDMI port can allow video and audio feed from the docked personal device to be transmitted to an external monitor or television via an HDMI cable attached to the docking station.

DETAILED DESCRIPTION OF ILLUSTRATIVE EMBODIMENT(S)

Figure 1:
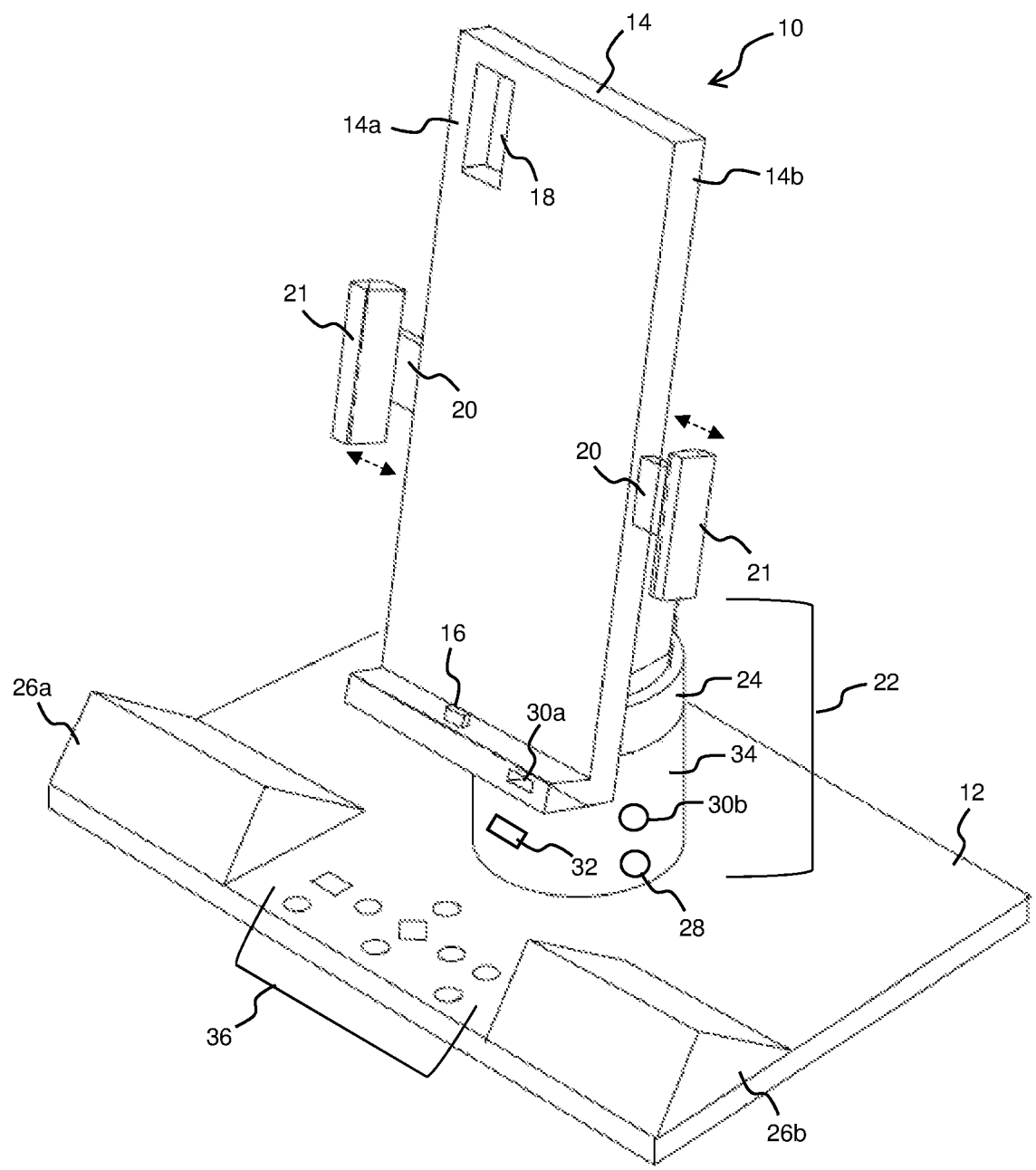
FIG. 1 is a front perspective view of a personal device docking station.

Turning first to FIG. 1, personal device docking station 10 can include base 12 and/or rest pad 14. In some embodiments, base 12 controls the mechanical movement of rest pad 14 and can be configured with a suitable power source to supply power to docking station 10. In some embodiments, docking station 10 can be charged by various means including a power cord, battery, a secondary device via a USB cable and/or via wireless induction.

In some embodiments, rest pad 14 can include a ledge with at least one port 16 to attach and connect a personal device such as a smartphone or tablet to docking station 10. In some embodiments, rest pad 14 can include multiple ports 16. In some embodiments, attachment of a personal device to port 16 allows docking station 10 to control and augment the audio and/or video capabilities of the personal device.

In some embodiments, rest pad 14 has two built in connector options. In some embodiments, the connector options are a USB-C connector and a Lightning Cable. In at least some embodiments, the connector fits into the base of the rest pad so that the device plugs into the bottom port when docked. Docking station 10 can be configured to charge a personal device when docked via port 16. In some embodiments, a single rest pad can accommodate the dimensions of a smartphone and a tablet. In some embodiments, docking station 10 includes a rest pad sized for use with a smartphone and a rest pad sized for use with a tablet. In some embodiments, the rest pads can be detachable and allow for the appropriately sized rest pad to be selected and attached to base 12.

In some embodiments, rest pad 14 can have a height of 4-8 inches (10.2-20.3 cm), a width of 3-6.25 inches (7.6-15.9 cm), and a thickness of 0.5-1 inch (1.3-2.5 cm). In some preferred embodiments, a rest pad for a smartphone can have a height of 4 inches (10.2 cm) and a width of 3 inches (7.6 cm). In some preferred embodiments, a rest pad for a tablet can have a height of 8 inches (20.3 cm) and a width of 6.5 inches (16.5 cm).

In some embodiments, the ledge of rest pad 14 can have a height of 0.5 inches (1.3 cm), a width of 3-6 inches (7.6-15.2 cm), and a thickness of 0.75 inches (1.9 cm) such that the combined thickness of the ledge and rest pad is 1.75 inches (4.4 cm).

In some embodiments, rest pad 14 can include at least one window 18 that aligns with the camera of a personal device. In some embodiments, window 18 allows a user to utilize both the rear-facing and front-facing camera capability of a personal device. In some embodiments, rest pad 14 can include multiple windows 18. Window 18 can be various dimensions and/or situated at various lengths along rest pad 14 to accommodate the varying camera positions of a personal device. In some embodiments, window 18 is biased to side 14a of rest pad 14. In some embodiments, window 18 is biased toward side 14b of rest pad 14. In some embodiments, window 18 extends the length of rest pad 14.

In some embodiments, rather than having a window, rest pad 14 can be made from a transparent material that allows a user to utilize both the rear-facing and front-facing camera capability of a personal device. In some embodiments, such a material can be scratch-resistant to prevent, or at least reduce the chance of artifacts that would distort or diminish the quality of the camera feed during video calls.

In some embodiments, rest pad 14 can include adjustable arms 20 that extend perpendicular from rest pad 14 and secure a personal device to docking station 10 using grips 21. In some embodiments, grips 21 can fasten around the front of a docked device or, alternatively, contact the sides of a docked device to apply an inward pressure to hold the device to the rest pad. In some embodiments, arms 20 can be adjustable, that is, moved closer to or away from the sides of rest pad 14 (indicated by the dashed arrows in FIGS. 1 and 2) to accommodate personal devices of various sizes. In at least some embodiments, arms 20 can be removed from rest pad 14.

Arms 20 can be various designs for adjustability including telescopic, accordion, and/or spring-assisted. In some embodiments, arms 20 can be adjusted via at least one internal tension spring 68 (shown in FIG. 2).

In some embodiments, arms 20 can have a height of 1.5-2 inches (3.8-5.1 cm). In some embodiments, grips 21 can have a height of 3.5-5 inches (8.9-12.7 cm) and a width of 1 inch (2.5 cm).

In some embodiments, arms 20 are biased to the top of rest pad 14 such that the upper ends of grips 21 extend past the top of the rest pad. In some embodiments, the distance between the top of arms 20 and the top of rest pad 14 can be 0.5-1 inches (1.3-2.5 cm).

In some embodiments, docking station 10 can be configured to utilize different sized rest pads. In some embodiments, these rest pads can be changed out depending on the size of the device being using with docking station 10. In some embodiments, these rest pads attach to docking station via a slide lock. In some embodiments, docking station 10 includes a first rest pad to be used with a smartphone and a second rest pad to be used with a tablet.

Docking station 10 can include various numbers of speakers. In some embodiments, docking station 10 can include a rotatable speaker 24 on neck 22 configured for 360 degrees of rotation. In some embodiments, docking station 10 can include speakers 26a and 26b situated on base 12. In some embodiments, speaker 24 can be single-channel.

In some embodiments, speakers 26a and 26b can be situated parallel relative to base 12. In some embodiments, speakers 26a and 26b can be angled relative to base 12. In some embodiments, speakers 26a and/or 26b can be detachable allowing a user to move the speakers to a desired location during a video call. In some embodiments, speakers 26a and/or 26b can be dual-channel to provide stereo sound.

In some embodiments, when a personal device is docked on docking station 10 via port 16, the audio feed from the personal device is routed to speakers 26a, 26b and/or 24.

Other features of docking station 10 can include power button 28, microphone 32, and/or at least one USB port. In some embodiments, docking station 10 can include USB ports 30a and/or 30b. In some embodiments, power button 28, microphone 32 and/or USB port 30b can be situated at the front of the device on pedestal 34 of neck 22.

In some embodiments, microphone 32 can enhance audio input to the internal microphone of a docked personal device.

In some embodiments, stationary pedestal 34 can include a plurality of microphones 32 situated around the circumference of pedestal 34. In some particular embodiments, docking station 10 can include four microphones situated at 0°, 90°, 180°, and 270° about the circumference of pedestal 34.

In some embodiments, docking station 10 can serve as a charging station to power secondary devices via USB ports 30*a* and/or 30*b*. In some embodiments, docking station 10 can serve as a charging station to power secondary devices via wireless charging.

Figure 2:
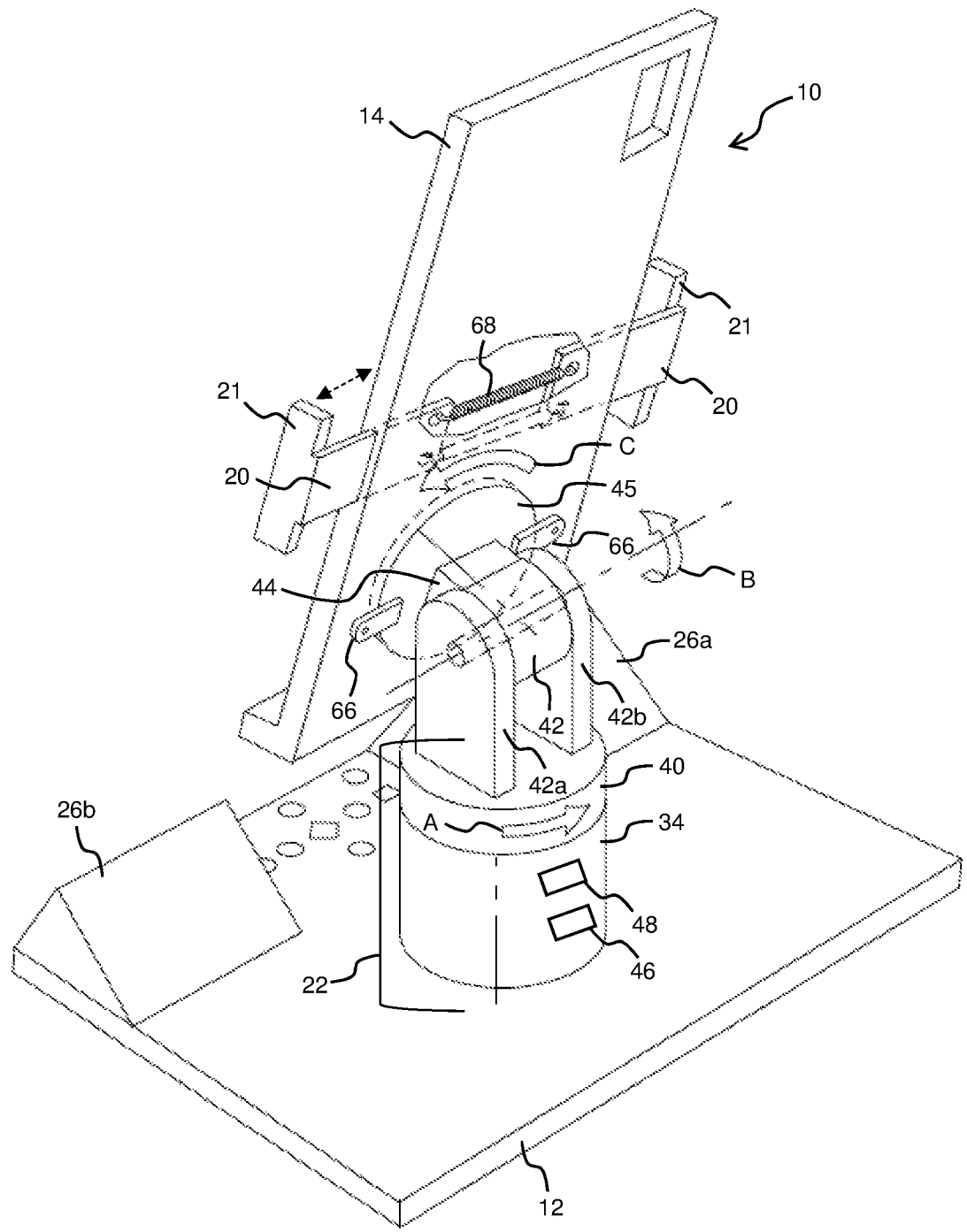
FIG. 2 is a partial transparent rear perspective view of a personal device docking station.

Turning to FIG. 2, a rear view of docking station 10 is shown. In some embodiments, docking station 10 can provide horizontal and vertical movement capability for a personal device such as a smartphone and/or tablet when mounted in port 16. FIG. 2 illustrates neck 22 which is situated perpendicular to base 12 and can include components to control the movement of rest pad 14. Base 12 can include both stationary and non-stationary components.

In some embodiments, neck 22 can include motorized horizontal rotation head 40 which rests on top of stationary pedestal 34 and rotates clockwise or counter-clockwise about the vertical axis of docking station 10 (indicated by arrow A in FIG. 2). In some embodiments, horizontal rotation head 40 can provide 360 degrees of horizontal rotation to rest pad 14 and speaker 24 (shown in FIG. 1). During use, the 360 degrees of horizontal rotation allow the personal device held in rest pad 14 and speaker 24 to accommodate most, if not all, video call participants.

In some embodiments, situated on top of horizontal rotation head 40 can be motorized vertical rotation head 42. In some embodiments, vertical rotation head 42 can be a ball and socket design. In some embodiments, vertical rotation head 42 can be a cylindrical component anchored directly or indirectly to the rear-facing surface of rest pad 14 and situated between standing members 42*a* and 42*b* which allow rotation of vertical rotation head 42 about the horizontal axis (indicated by arrow B in FIG. 2). In some embodiments, vertical rotation head 42 can tilt rest pad 14 upward and downward. In some embodiments, vertical rotation head 42 can be configured to upwardly tilt at least seventy-five-degrees from the horizontal axis. In some embodiments, vertical rotation head 42 can be configured to upwardly tilt between ten and ninety degrees from the horizontal. During use, such a rotation can allow the personal device held in rest pad 14 to view standing video call participants.

In at least some embodiments, vertical rotation head 42 can be configured for free rotation about the x-, y- and/or z-axis. In some embodiments, vertical rotation head 42 can flip rest pad 14 from a forward-facing (toward speakers 26*a* and 26*b*) to a rear-facing (away from speakers 2*ba* and 26*b*) orientation.

In some embodiments, neck 22 can include portrait & landscape rotation head 44 that extends from vertical tilt head 42 and attaches to plate 45 located on the back of rest pad 14. In some embodiments, rotation head 44 can function to rotate rest pad 14 clockwise and/or counter-clockwise from the vertical axis of docking station 10 to orient the docked personal device to a portrait or landscape video mode (indicated by arrow C in FIG. 2). In some embodiments, rotation head 44 rotates rest pad 14 ninety-degrees clockwise and/or counter-clockwise. In some embodiments, the diameter of plate 45 can be 2 inches (5.08 cm). In some embodiments, plate 45 can be positioned such that the distance between the bottom of the plate and the bottom of rest pad 14 is 3 inches (7.62 cm).

FIG. 2 also illustrates additional features that can be included in docking station 10. In some embodiments, such as when rest pad 14 is detachable, docking station 10 can include a plurality of release tabs 66 that allow one rest pad, such as a rest pad accommodating a smartphone, to be switched out for another, such as a rest pad accommodating a tablet.

In some embodiments, docking station 10 can include a rear-facing USB port 46 that can serve as a power source input.

In some embodiments, docking station 10 can include HDMI port 48. In some embodiments, HDMI port 48 can allow the video and audio output from a personal device connected to docking station 10 to be transmitted to an external television or monitor. In some embodiments, once an HDMI cable is connected from HDMI port 48 to the television, the video and audio stream from the docked device can be mirrored on the television or monitor.

In some embodiments, the movement manipulations of docking station 10 can be controlled directly from the docking station using control panel 36, remotely using remote control 70, and/or by a second smart device. In some embodiments, the second smart device is paired to docking station 10. In some embodiments, the second smart device is paired to docking station 10 via Bluetooth. In some embodiments, docking station 10 has a pair/unpair button to facilitate pairing a second smart device.

Figure 3:
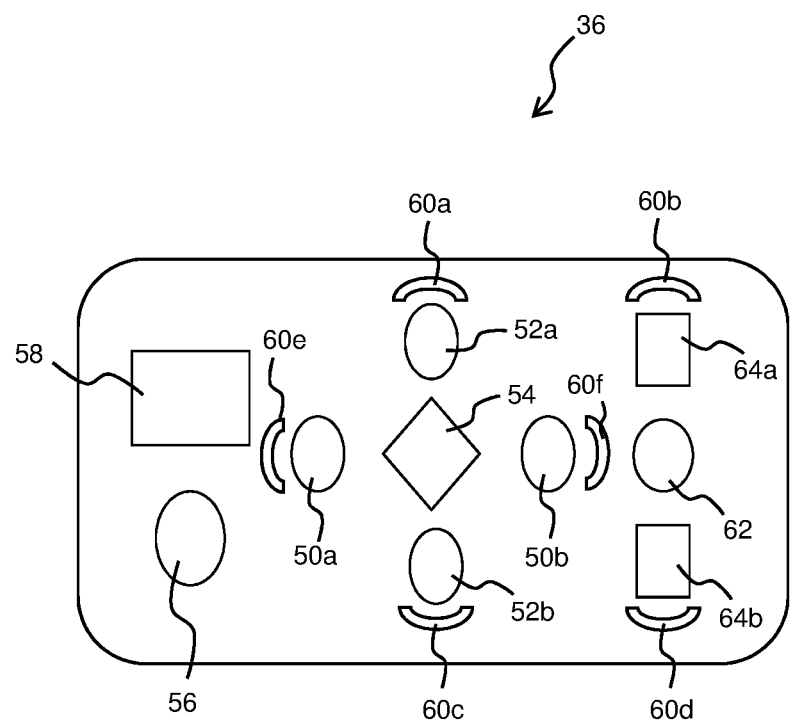
FIG. 3 is an enlarged, top view of the control panel of FIG. 1.

FIG. 3 illustrates an enlarged view of control panel 36 from FIG. 1. In some embodiments, control panel 36 can include buttons 52*a* and 52*b* that control, at least, the upward and downward vertical tilt of vertical rotation head 42. In some embodiments, buttons 50*a* and 50*b* can control the horizontal rotation of horizontal rotation head 40. In some embodiments, control panel 36 can include a plurality of LED lights 60*a*-60*d* that indicate (light up) when an upper or lower rotational limit has been reached on an applicable axis of docking station 10. For example, in some embodiments, lights 60*a*-60*d* can illuminate when an upper (lights 60*a* and 60*b*) or lower (lights 60*c* and 60*d*) vertical tilt limit of vertical rotation head 42 has been reached.

In some embodiments, control panel 36 can include LED lights 60*e* and 60*f* which illuminate when a clockwise or counterclockwise rotation limit has been reached.

In some embodiments, control panel 36 can include home button 54. In at least some embodiments, when a user presses home button 54, docking station 10 can be rotated such that it returns to a preset, default or resting position.

In some embodiments, control panel 36 can include portrait and landscape selection button 58 that, when pressed by a user, switches rest pad 14, along with the docked personal device, from a portrait to a landscape orientation via portrait & landscape rotation head 44.

In some embodiments, the output audio feed of docking station 10 can be increased or decreased via volume buttons 64*a* and 64*b*. In some embodiments, the output audio feed of docking station 10 can be muted via mute button 62.

In some embodiments, microphone 32 can be muted via microphone mute button 56.

Figure 4:
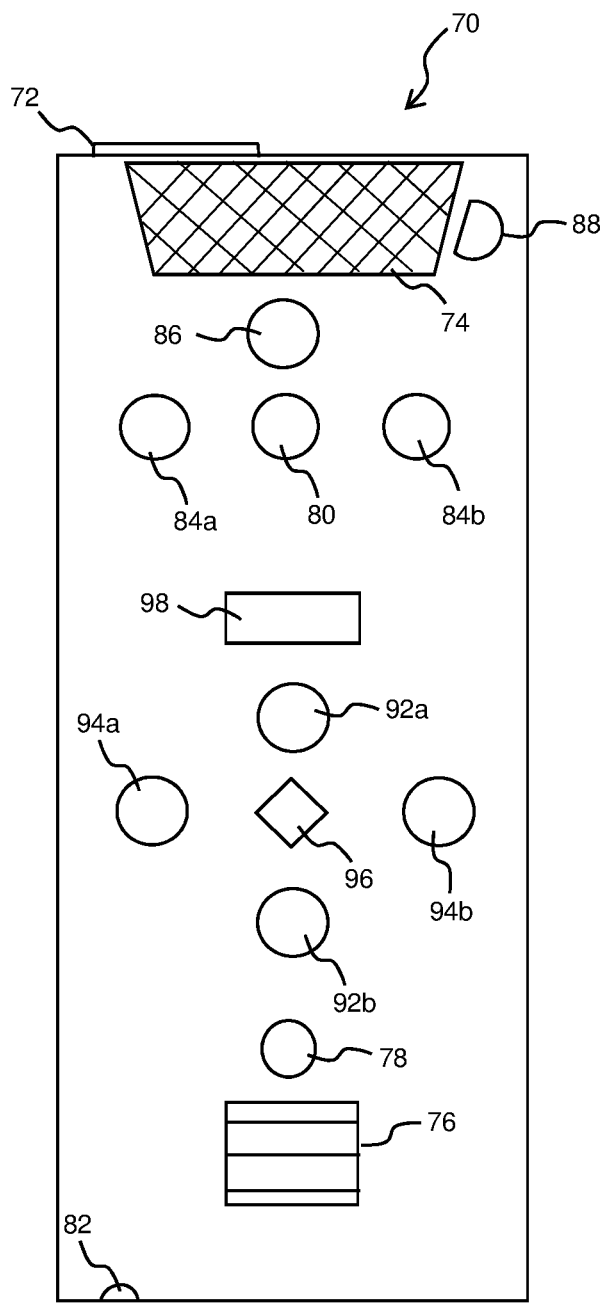
FIG. 4 is a top view of a remote that can be used to control a personal device docking station.

In some embodiments, docking station 10 can be configured to establish a bidirectional wireless connection with remote control 70, shown in FIG. 4.

In some embodiments, remote control 70 can be configured for bidirectional communication with docking station 10 via wireless transmitter/receiver 72. In some embodiments, remote control 70 can include speaker 74 and microphone 76 which allows audio outputted to docking station 10 via the docked personal device to be simultaneously outputted to remote control 70. This allows a user situated at a distance from docking station 10 to hear audio output, as well as deliver audio input by speaking into microphone 76. Should a user wish to transmit and receive audio exclusively from docking station 10, microphone 76 can be muted via microphone mute button 78 and speaker 74 can be muted via speaker mute button 80.

In some embodiments, remote control 70 can be powered on and off via power button 86.

In some embodiments, remote control 70 can include headphone port 82. In some embodiments, use of headphone port 82 prevents audio from a docked personal device from being played over speakers 24, 26a and 26b of docking station 10 and/or speaker 74 of remote control 70.

In some embodiments, the output audio feed of remote control 70 can be increased or decreased via volume buttons 84a and 84b.

In some embodiments, remote control 70 can be configured to control its own output audio feed as well as that of speakers 24, 26a and 26b of docking station 10. In some embodiments, the volume of speaker 74 on remote control 70 can be configured to increase or decrease proportionally with the volume of speakers 24, 26a and/or 26b. In some of these embodiments, volume buttons 84a and 84b can increase or decrease the volume of speakers 24, 26a and/or 26b which correspondingly adjust the volume of speaker 74 on remote control 70.

In some embodiments, remote control 70 can include buttons to independently control the volume of the speakers 24, 26a and/or 26b on docking station 10 and the volume of speaker 74 on remote control 70. In some embodiments, remote control 70 can include mute button 88 to mute speakers 24, 26a and/or 26b on docking station 10.

In some embodiments, remote control 70 can include buttons 92a and 92b that control, at least, the upward and downward vertical tilt of vertical rotation head 42. In some embodiments, buttons 94a and 94b can control the horizontal rotation of horizontal rotation head 40.

In some embodiments, remote control 70 can include home button 96. In some embodiments, when a user presses home button 96, docking station 10 can be rotated such that it returns to a preset, default or resting position.

In some embodiments, remote control 70 can include portrait and landscape selection button 98 that, when pressed by a user, switches rest pad 14, along with the docked personal device, from a portrait to a landscape orientation via portrait & landscape rotation head 44.

In some embodiment, remote control 70 is powered by a Li-Ion battery that can be recharged. In some embodiments, remote control 70 is powered by removable batteries such as AA or AAA batteries.

Figure 5:
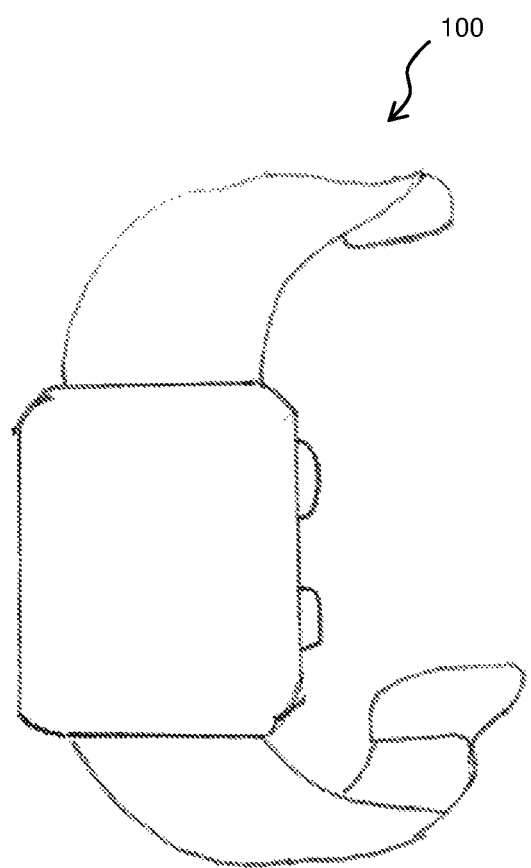
FIG. 5 is a perspective view of a smartwatch that can be used to control a personal device docking station.
Figure 6:
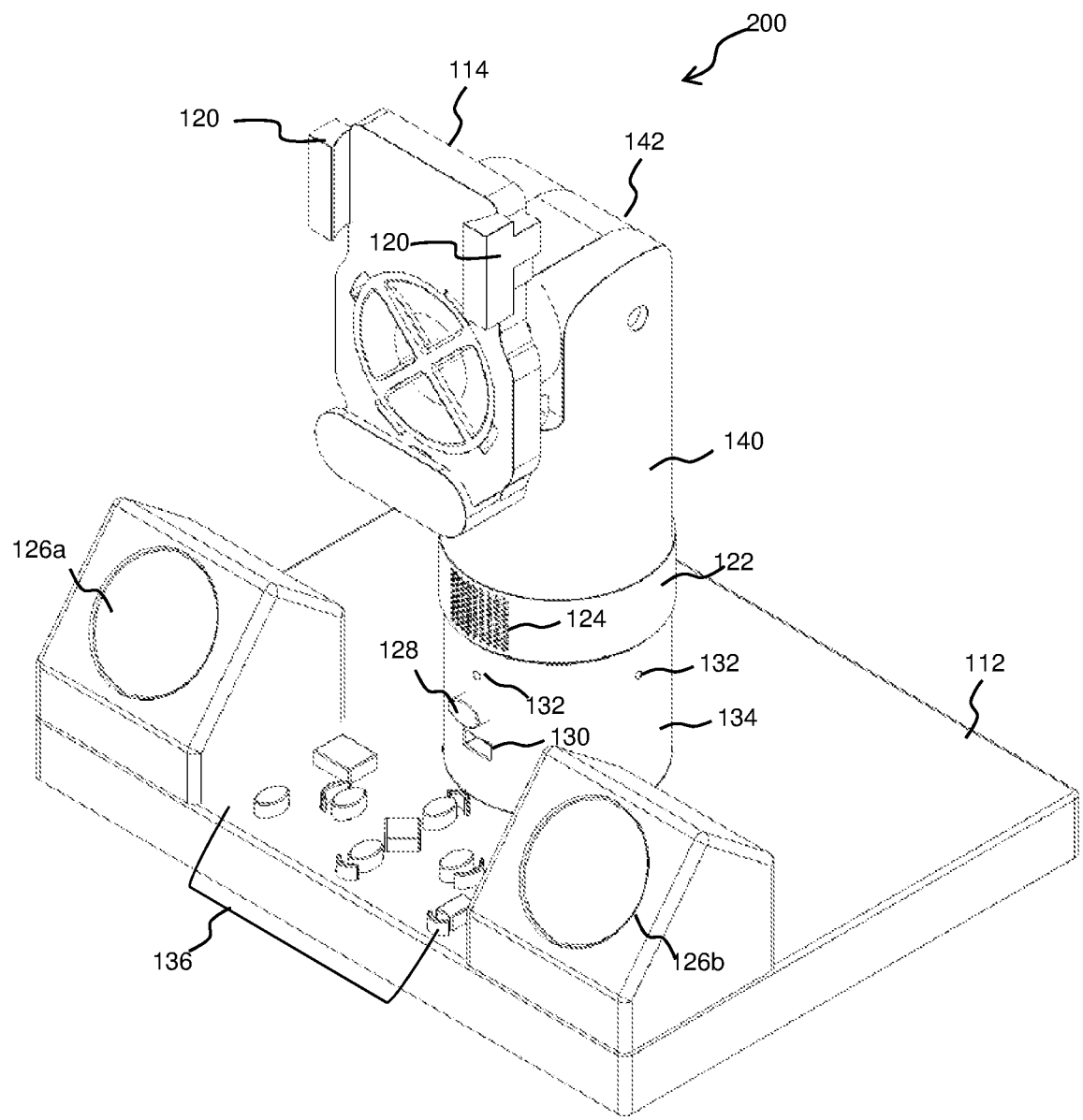
FIG. 6 is a front perspective view of a second embodiment of a personal device docking station.
Figure 7:
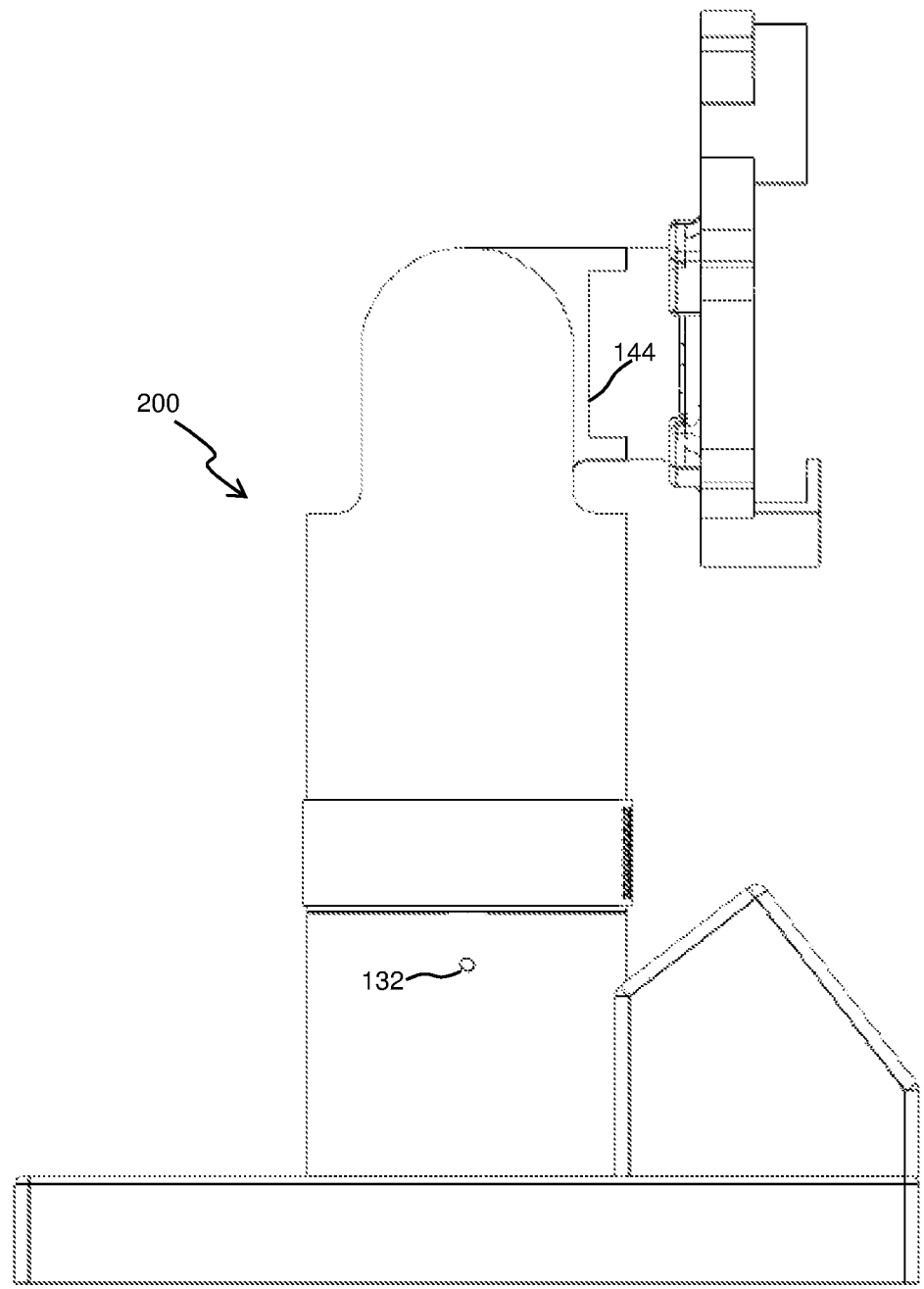
FIG. 7 is a side view of a second embodiment of a personal device docking station.
Figure 8:
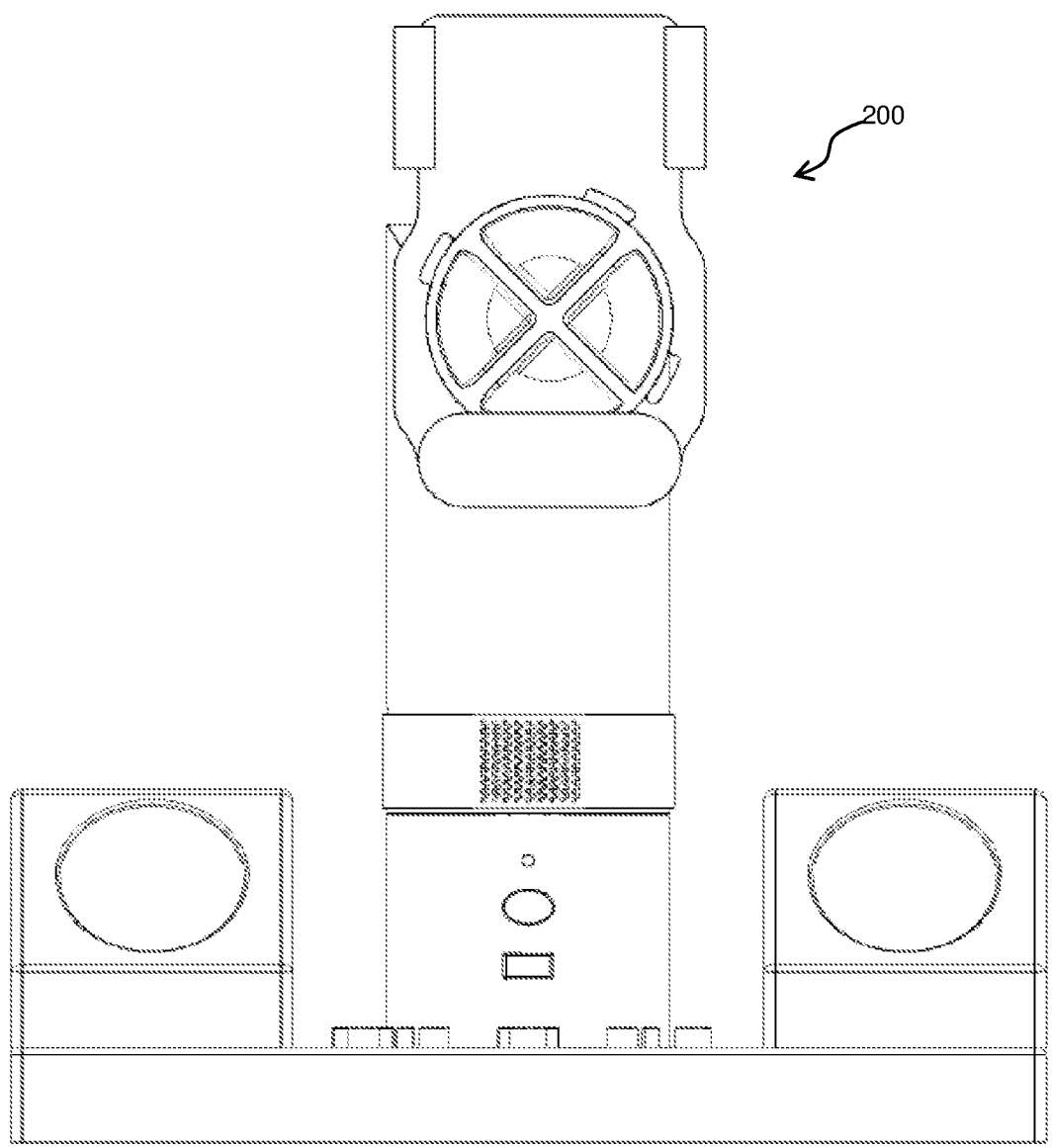
FIG. 8 is a front view of a second embodiment of a personal device docking station.
Figure 9:
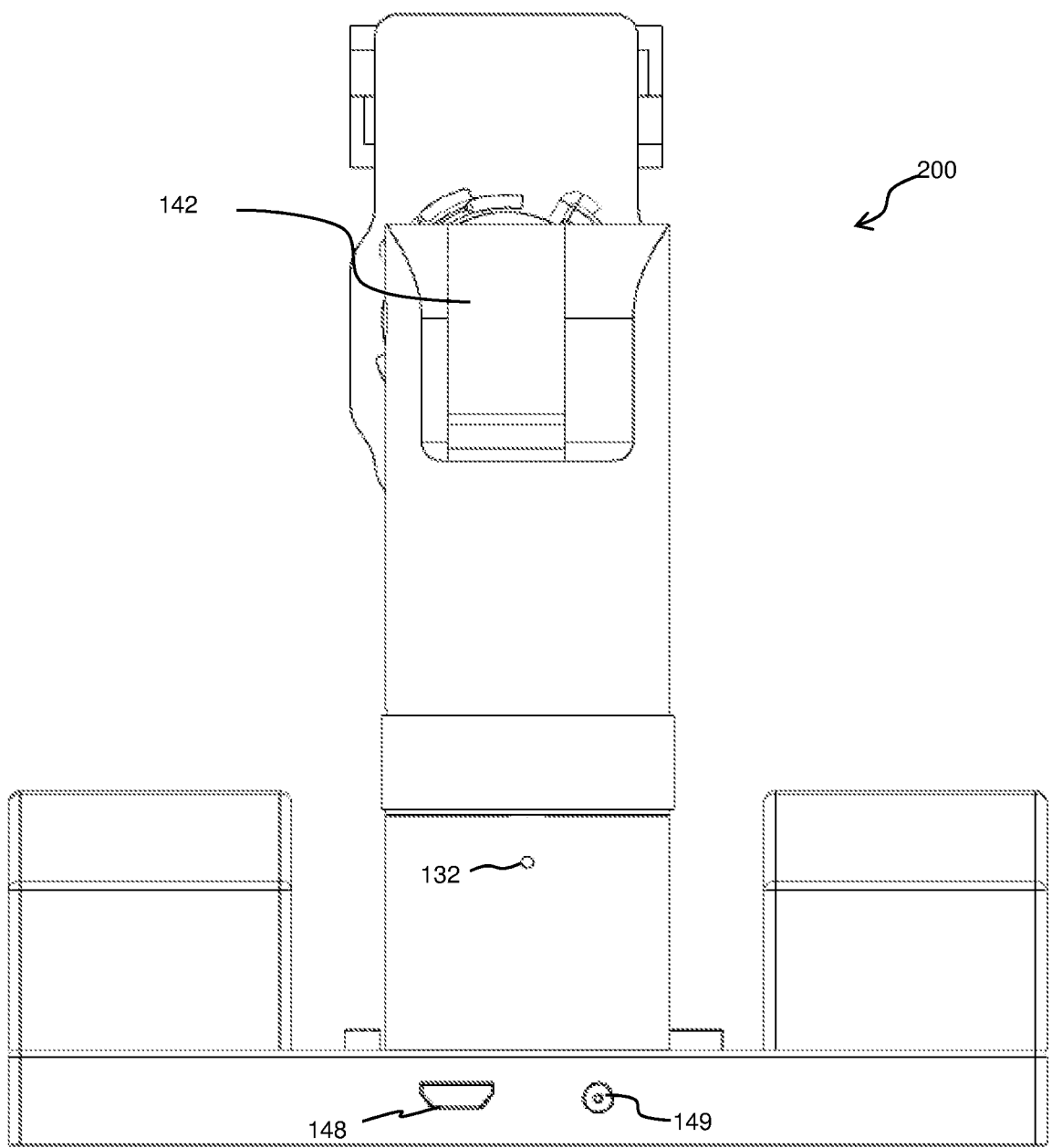
FIG. 9 is a back view of a second embodiment of a personal device docking station.
Figure 10:
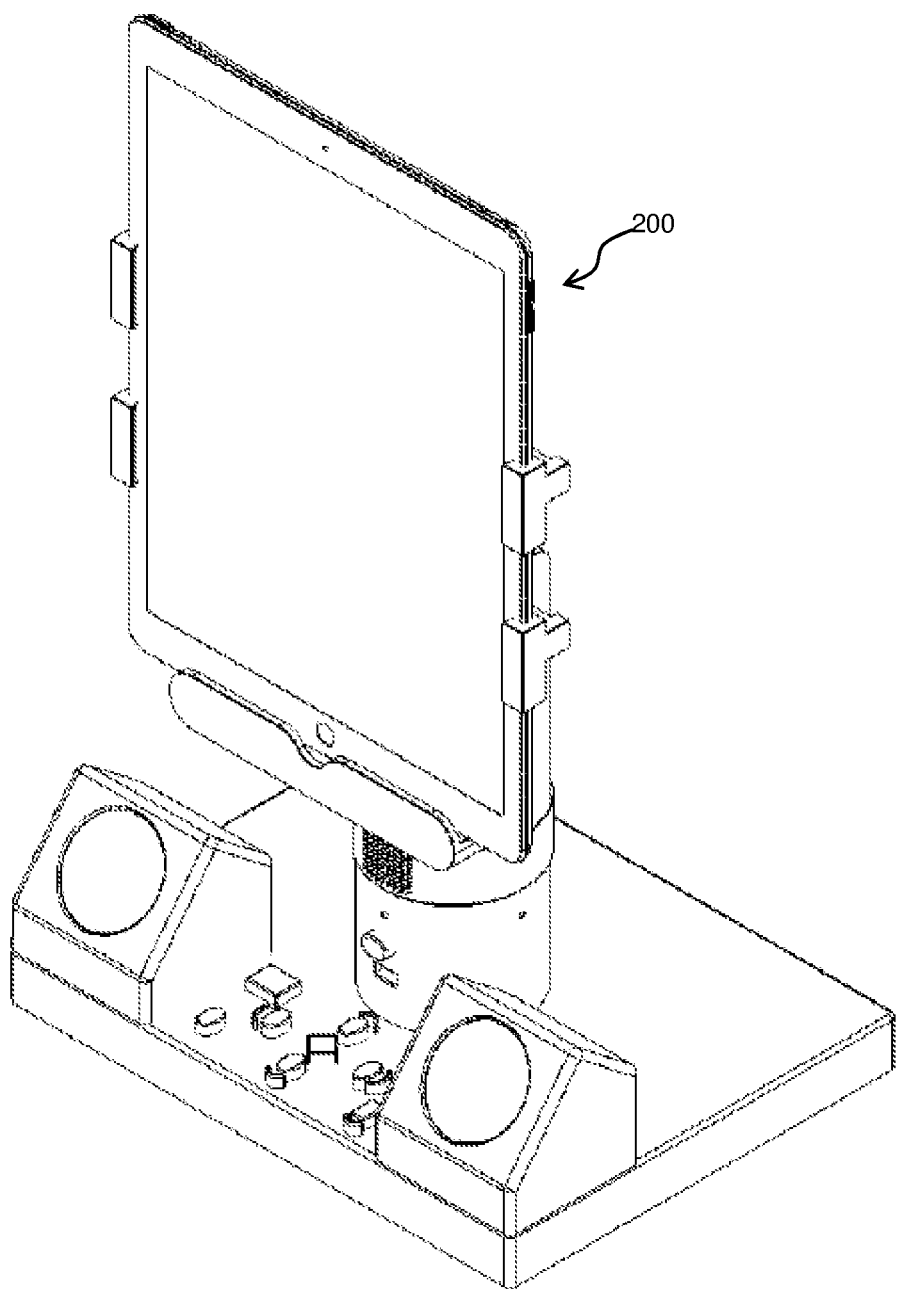
FIG. 10 is a perspective view of an embodiment of a personal device docking station utilizing a tablet.
Figure 11:
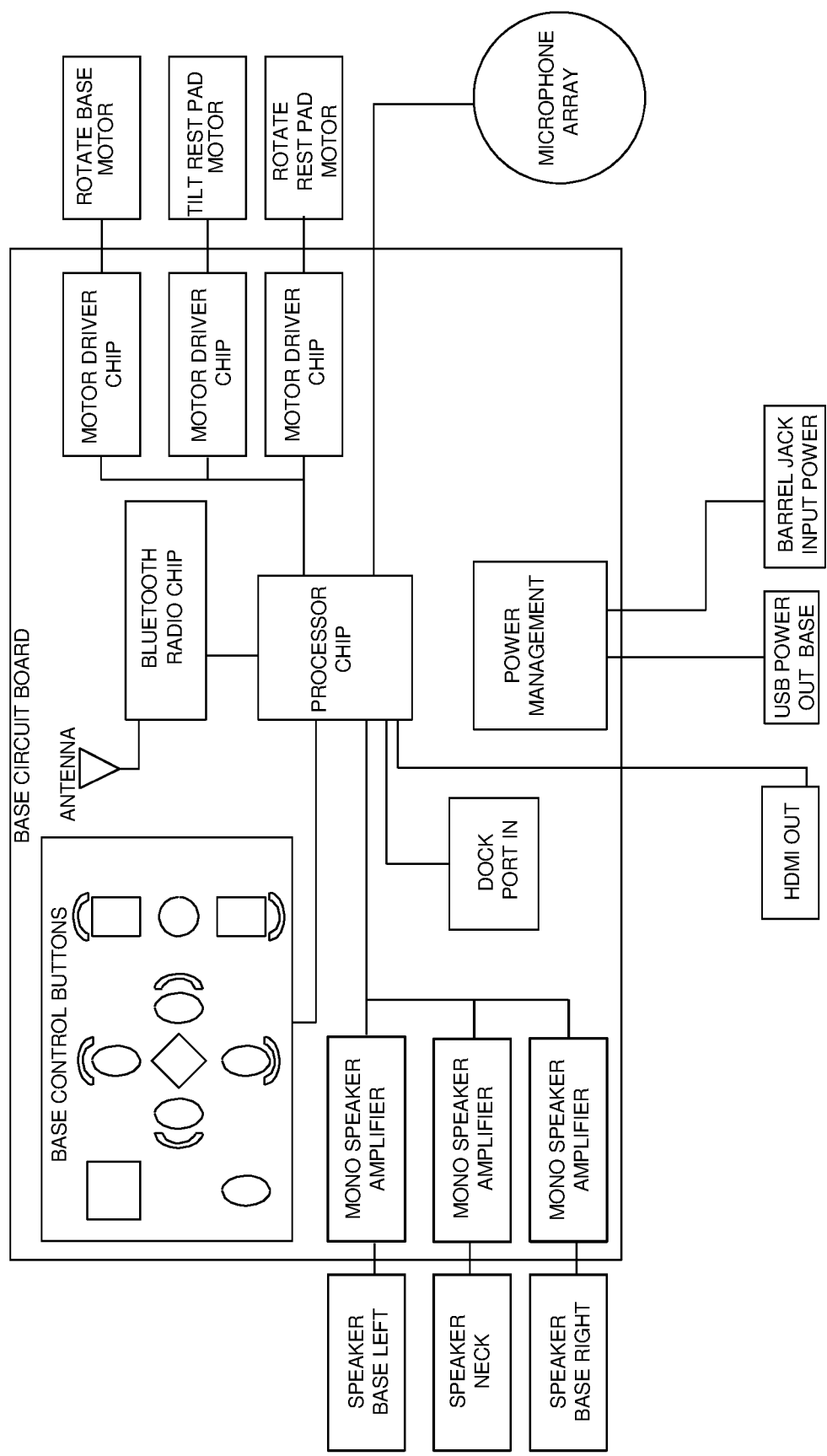
FIG. 11 is an electronic schematic of an exemplary personal device docking station.

FIG. 5 illustrates smartwatch 100 that can be used to control some embodiments of docking station 10 via a customized software platform. In some embodiments, customized software can control the horizontal and vertical movement and portrait/landscape orientation of docking station 10 and/or the volume of speakers 24, 26a and/or 26b.

In some embodiments, remote control of docking station 10 can be carried out via an application on a secondary personal device including, but not limited to, a laptop, smartphone, or tablet.

Personal device docking station can include a circuit board built into the base with a processor. In at least some embodiments, the processor reads inputs from the base buttons, base microphones, remote and/or the docked device. In at least some embodiments, the processor can use the inputs to control outputs to the motors, speakers and/or the remote. In some embodiments, the circuit board, motors and/or speakers are powered by a barrel jack connector. In some embodiments, the barrel jack connector is located at the rear of the base of personal device docking station.

FIG. 6-FIG. 9 illustrate a second embodiment of a personal device docking station 200. Where appropriate, the features disclosed above in relation to docking station 10, also apply to docking station 200.

In the embodiment shown, docking station 200 include various speakers. In the illustrated embodiment, docking station 200 includes rotatable speaker 124 on neck 122 configured for 360 degrees of rotation and speakers 126a and 126b situated on base 112.

Personal device docking station 200, as illustrated, also includes rest pad 114 to hold a personal device such as a smartphone or tablet. In the shown embodiment, base 112 controls the mechanical movement of rest pad 114 and can be configured with a suitable power source to supply power to docking station 200.

In the illustrated embodiment, rest pad 114 includes adjustable arms 120 that secure a personal device to docking station 200. In the shown embodiment, arms 120 are adjustable to accommodate personal devices of various sizes.

In some embodiments, such as when rest pad 114 is detachable, docking station 200 can include a plurality of release tabs that allow one rest pad, such as a rest pad accommodating a smartphone, to be switched out for another, such as a rest pad accommodating a tablet.

In the shown embodiment, arms 120 are telescopic and spring-assisted.

Other features of the illustrated embodiment of docking station 200 include: power button 128; control panel 136; four microphones 132 positioned around the circumference of pedestal 134; HDMI port 148; barrel jack connector 149; and USB port 130.

In the illustrated embodiment of docking station 200, motorized vertical rotation head 142 tilts rest pad 114 upward and downward. In some embodiments, vertical rotation head 142 can be configured to upwardly tilt between ten and ninety degrees from the horizontal axis. In some embodiments, hard stops are used to prevent vertical rotation head 142 from going past ninety degrees.

In the illustrated embodiment of docking station 200, motorized portrait & landscape rotation head 144 is configured to rotate rest pad 114 clockwise and/or counter-clockwise from the vertical axis of docking station 200 to orient the docked personal device to a portrait or landscape video mode. In some embodiments, hard stops are used to prevent motorized portrait & landscape rotation head 144 from moving past a portrait and/or landscape position.

In the illustrated embodiment of docking station 200, neck 122 includes motorized horizontal rotation head 140 which rests on top of stationary pedestal 134 and rotates clockwise or counter-clockwise about the vertical axis of docking station 200. In the illustrated embodiment, horizontal rotation head 140 provides 360 degrees of horizontal rotation to rest pad 114 and speaker 124.

In the illustrate embodiment, the movement manipulations of docking station 200 can be controlled directly from the docking station using control panel 136 or remotely using a remote control, such as remote control 70.

Figure 12:
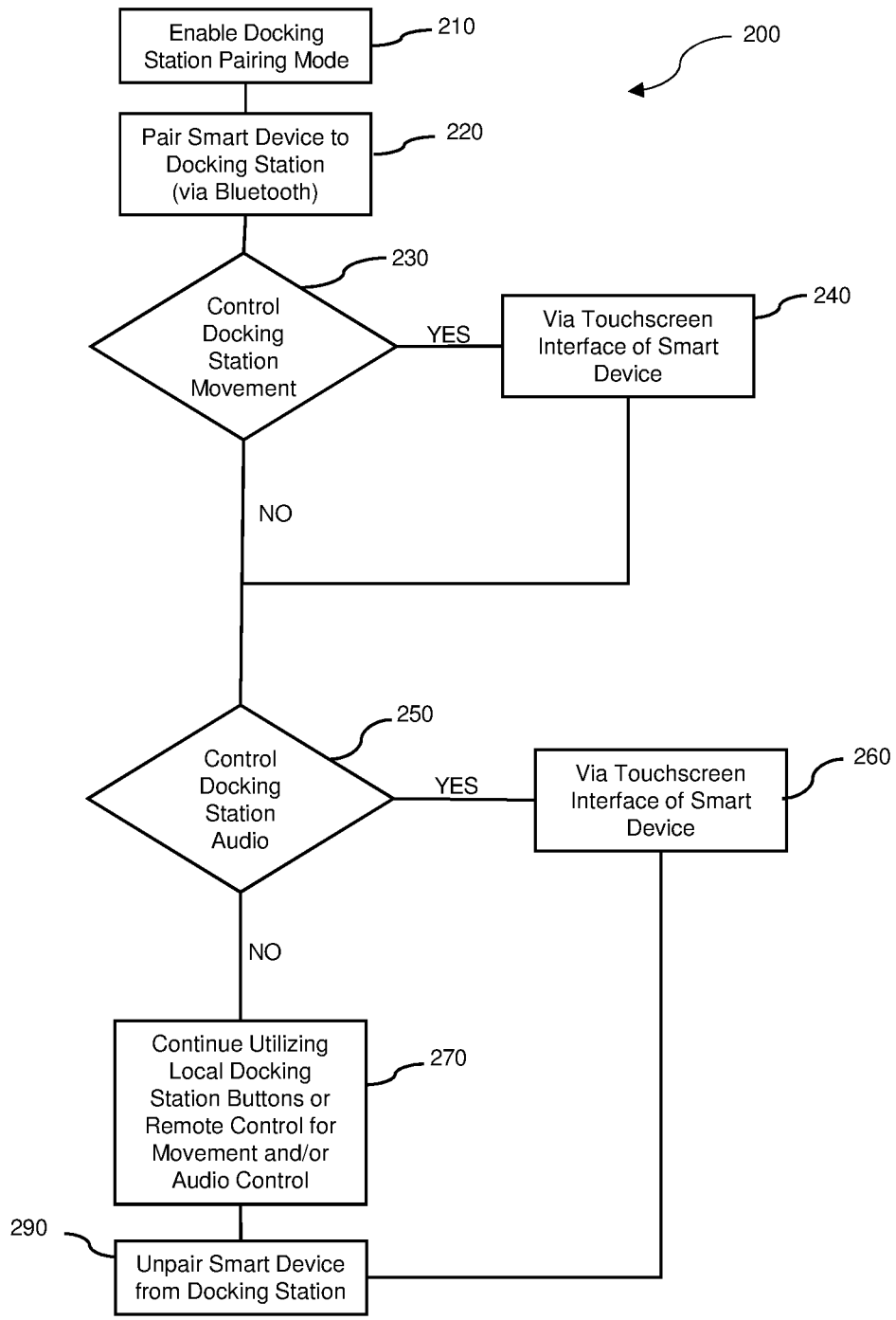
FIG. 12 is a flow chart showing the use of a smart device to control a personal device docking station.
Figure 13:
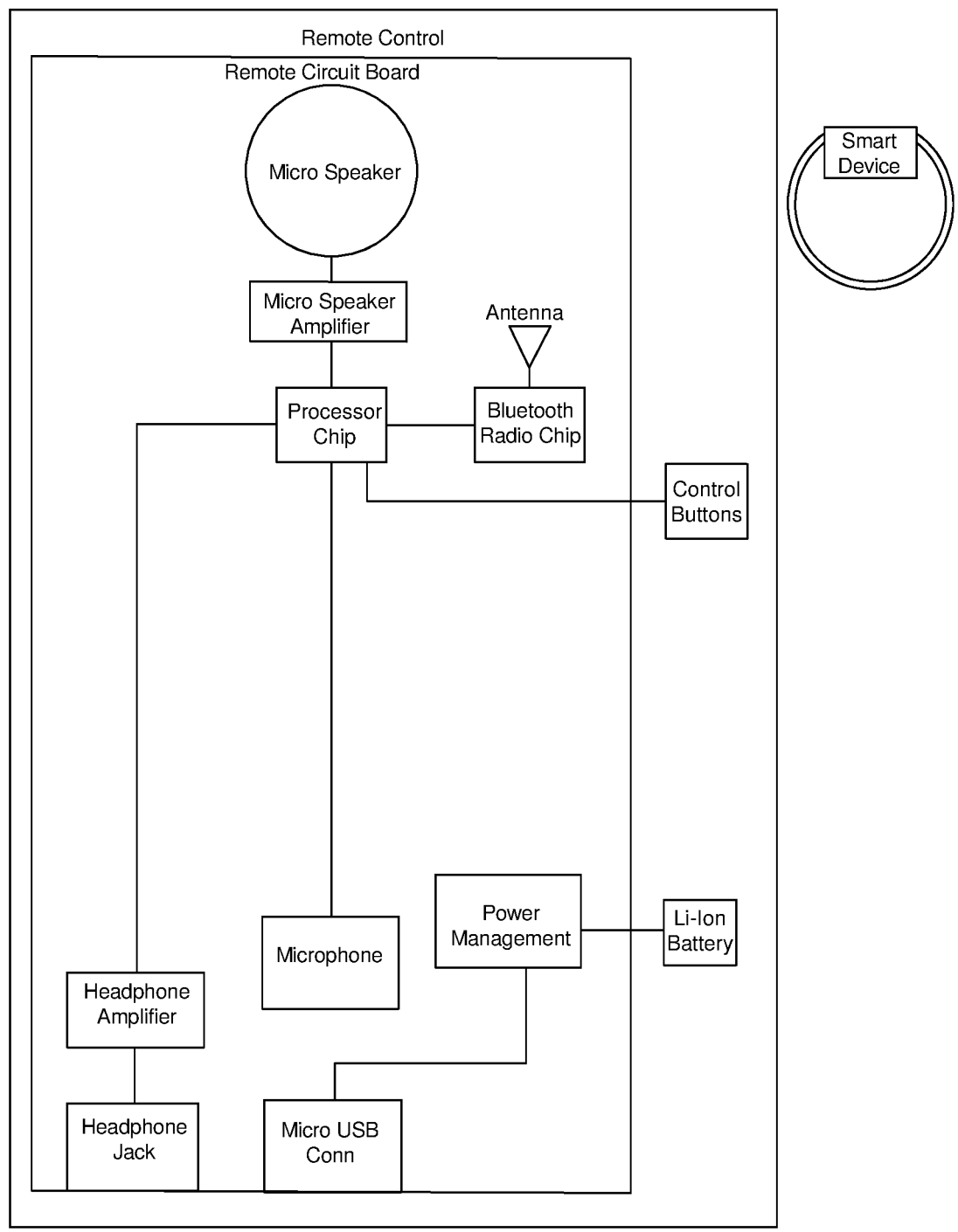
FIG. 13 is an electronic schematic of an exemplary remote control configured to work with a personal device docking station.

FIG. 12 is a flow chart showing the use of a smart device to control a personal device docking station. In at least some embodiments, at 210 personal device docking station can enter a pairing mode. At 220 a smart device is paired to docking station. In some embodiments, this pairing is done via Bluetooth. In some embodiments, the movement of the docking station can be controlled at 230. In some embodiments, the smart device is used to control the movement of docking station at 240. In some embodiments, the audio of the docking station can be controlled at 250. In some embodiments, the smart device is used to control the audio of docking station at 260. In some embodiments the docking station's buttons are used to control movement and/or audio of the docking station at 270. In at least some embodiments, at 290 personal device docking station is unpaired from the smart device.

While elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A personal device docking station comprising:
   (a) a base;
   (b) a neck situated substantially perpendicular to said base with a stationary portion and a non-stationary portion, wherein said non-stationary portion of said neck comprises:
      (i) a first motorized rotation head;
      (ii) a second motorized rotation head; and
      (iii) a third motorized rotation head;
   (c) a rest pad connected to said non-stationary portion of said neck, wherein said rest pad holds a personal device and comprises:
      (i) a back;
      (ii) a ledge;
      (iii) a first side; and
      (iv) a second side,
   (d) a port for connecting said personal device to said docking station, wherein said port is located on said ledge of said rest pad;
   (e) a first speaker;
   (f) a control panel; and
   (g) a plurality of microphones that allow for audio input into said docking station, wherein said plurality of microphones are located circumferentially around said stationary portion of said neck,
      wherein, when said personal device is docked in said docking station via said port, bidirectional audio feed is established between said personal device and said docking station.

2. The personal device docking station of claim 1, wherein said personal device is a smartphone.

3. The personal device docking station of claim 1, wherein said personal device is a tablet.

4. The personal device docking station of claim 1, wherein said rest pad further comprises:
   (v) a window formed within said back that aligns with a camera of said personal device.

5. The personal device docking station of claim 4, wherein alignment of said camera with said window allows a user to utilize said camera's rear-facing and front-facing capability during a video call.

6. The personal device docking station of claim 1, wherein said rest pad further comprises:
   (v) a first adjustable arm that extends from said first side; and
   (vi) a second adjustable arm that extends from said second said,
   wherein said first adjustable arm and said second adjustable arm can be moved to accommodate and secure a plurality of personal device sizes.

7. The personal device docking station of claim 1, wherein said first speaker is built into said non-stationary portion of said neck.

8. The personal device docking station of claim 1, wherein said first motorized rotation head can rotate clockwise or counter-clockwise and provide 360 degrees of horizontal rotation to said rest pad.

9. The personal device docking station of claim 1, wherein said second motorized rotation head can tilt upward or downward and provide vertical rotation to said rest pad.

10. The personal device docking station of claim 1, wherein said third motorized rotation head can rotate said rest pad substantially 90 degrees clockwise or counter-clockwise from a vertical axis of said docking station.

11. The personal device docking station of claim 1, wherein operation of said third motorized rotation head alters a camera orientation of said personal device when connected to said docking station from a portrait orientation to a landscape orientation.

12. The personal device docking station of claim 1, wherein said control panel comprises:
   (i) a first set of buttons that control the movement of said first motorized rotation head;
   (ii) a second set of buttons that control the movement of said second motorized rotation head;
   (iii) a portrait/landscape selection button that controls the movement of said third motorized rotation head; and
   (iv) a plurality of volume buttons that control the audio output of said first speaker.

13. The personal device docking station of claim 1, wherein said control panel comprises:
   a plurality of LED lights that indicate when a rotational limit of said first motorized rotation head, said second motorized rotation head or said third motorized rotation head has been reached.

14. The personal device docking station of claim 1, further comprising a remote control with a wireless transmitter/receiver configured for bidirectional communication with said docking station.

15. The personal device docking station of claim 14, wherein said remote control comprises:
   (i) a power button;
   (ii) a speaker;
   (iii) a microphone;
   (iv) a first set of buttons that control the movement of said first motorized rotation head;
   (v) a second set of buttons that control the movement of said second motorized rotation head;
   (vi) a portrait/landscape selection button that controls the movement of said third motorized rotation head;
   (vii) a plurality of volume buttons that control the audio output of said speaker of said remote control; and
   (viii) a headphone port.

16. The personal device docking station of claim 1, further comprising:
   (h) a pair of speakers, wherein said pair of speakers are located on said base.

17. The personal device docking station of claim 1, further comprising:
   (h) at least one USB port.

18. The personal device docking station of claim 1, further comprising:
   (h) at least one HDMI port, wherein said at least one HDMI port allows a video and an audio output from said personal device connected to said docking station to be transmitted to an external monitor or television via an HDMI cable.

19. The personal device docking station of claim 1, wherein said control panel further comprises:

a home button, wherein when a user selects said home button, said personal device docking station moves to a preset or default position.

\* \* \* \* \*